United States Patent
Yamasaki et al.

(10) Patent No.: US 10,221,593 B2
(45) Date of Patent: Mar. 5, 2019

(54) SEAT LOCK STRUCTURE FOR SADDLE RIDING VEHICLE

(71) Applicant: HONDA MOTOR CO., LTD., Minato-Ku, Tokyo (JP)

(72) Inventors: Shota Yamasaki, Wako (JP); Yoshihito Tokuda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/565,342

(22) PCT Filed: Apr. 24, 2015

(86) PCT No.: PCT/JP2015/062589
§ 371 (c)(1),
(2) Date: Oct. 9, 2017

(87) PCT Pub. No.: WO2016/170688
PCT Pub. Date: Oct. 27, 2016

(65) Prior Publication Data
US 2018/0073285 A1   Mar. 15, 2018

(51) Int. Cl.
*E05B 83/16* (2014.01)
*B62J 1/12* (2006.01)
(Continued)

(52) U.S. Cl.
CPC .............. *E05B 83/16* (2013.01); *B62J 1/12* (2013.01); *B62J 1/14* (2013.01); *B62K 11/04* (2013.01); *E05B 83/00* (2013.01); *E05B 85/06* (2013.01)

(58) Field of Classification Search
CPC .......... E05B 83/16; E05B 83/00; E05B 83/06; B62K 11/04; B62J 1/12; B62J 1/14
(Continued)

(56) References Cited

U.S. PATENT DOCUMENTS

| 4,073,170 A * | 2/1978 | Miyabayashi | .......... E05B 83/16 292/216 |
| 4,157,844 A * | 6/1979 | Sarosy | .................... E05B 83/16 292/216 |

(Continued)

FOREIGN PATENT DOCUMENTS

| EP | 1 577 200 A1 | 9/2005 |
| EP | 3287348 A4 * | 5/2018 |

(Continued)

OTHER PUBLICATIONS

Forms PCT/IB/338, and PCT/IPEA409, the English translation of International Preliminary Report on Patentability and notification thereof dated Oct. 24, 2017 from PCT/JP2015/062589.

(Continued)

*Primary Examiner* — Suzanne L Barrett
(74) *Attorney, Agent, or Firm* — Carrier Blackman & Associates, P.C.; Joseph P. Carrier; Anne G. Sabourin

(57) ABSTRACT

There is provided a seat lock structure for a saddle riding vehicle which is user-friendly and can be downsized. A key cylinder includes a turning arm which is turned by a key operation, a seat lock mechanism includes a first bracket which is fixed to a vehicle body frame, and a second bracket which is slidably supported on the first bracket and engageable with a rear seat side, and the second bracket is slid by being pressed by the turning arm, and an L-shaped end portion formed on the second bracket regulates the second bracket from being slid when the turning arm is unturnable.

15 Claims, 10 Drawing Sheets

(51) Int. Cl.
*E05B 83/00* (2014.01)
*B62J 1/14* (2006.01)
*E05B 85/06* (2014.01)
*B62K 11/04* (2006.01)

(58) Field of Classification Search
USPC .................. 70/162–169, 233, 256, 261
See application file for complete search history.

(56) References Cited

U.S. PATENT DOCUMENTS

| | | | | |
|---|---|---|---|---|
| 6,237,710 | B1 * | 5/2001 | Mori | B62H 5/00 |
| | | | | 180/219 |
| 6,623,071 | B2 * | 9/2003 | Kawamoto | B62J 1/12 |
| | | | | 297/188.09 |
| 7,448,663 | B2 | 11/2008 | Fujimoto et al. | |
| 8,978,808 | B2 * | 3/2015 | Tanaka | B62K 11/00 |
| | | | | 180/219 |
| 2014/0291958 | A1 | 10/2014 | Tanaka | |

FOREIGN PATENT DOCUMENTS

| | | |
|---|---|---|
| JP | S50-51310 U | 5/1975 |
| JP | S52-148660 U | 11/1977 |
| JP | S59-110290 U | 7/1984 |
| JP | 2001-071795 A | 3/2001 |
| JP | 2007-062561 A | 3/2007 |
| JP | 2010-036596 A | 2/2010 |
| JP | 2012-025273 A | 2/2012 |
| JP | 2014-189104 A | 10/2014 |
| TW | 1335887 B | 1/2011 |

OTHER PUBLICATIONS

Office Action issued in the corresponding Taiwanese Patent Application 10621050270 dated Oct. 17, 2017.

Extended European search report issued in the corresponding EP Patent Application 15889927.8, dated Apr. 6, 2018.

* cited by examiner

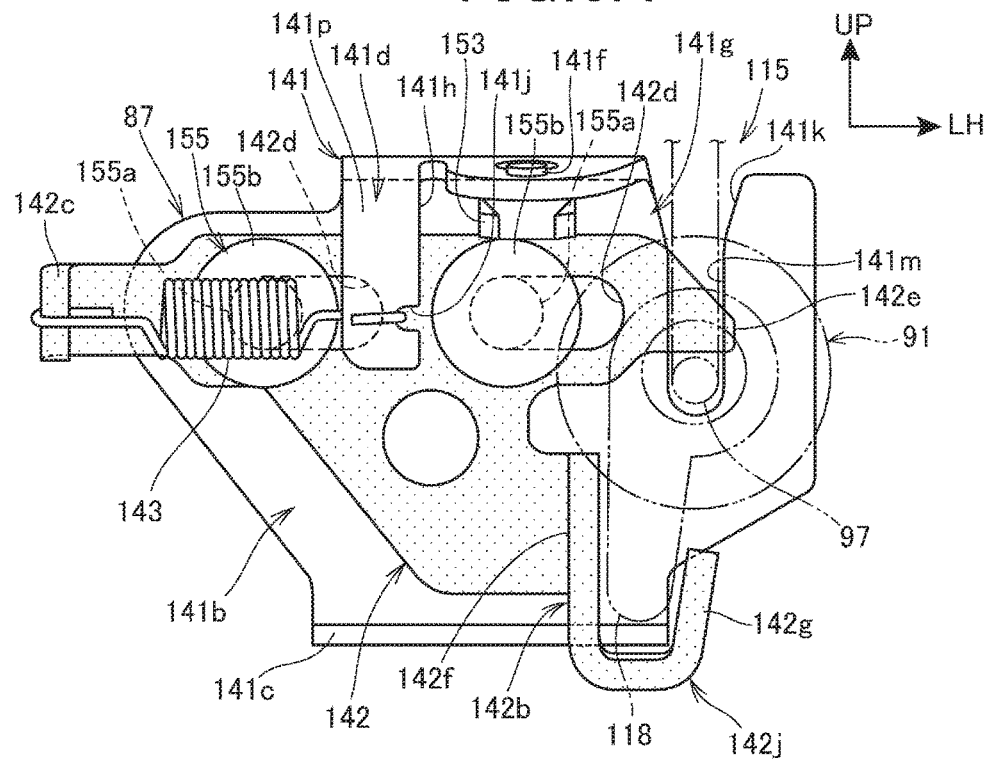
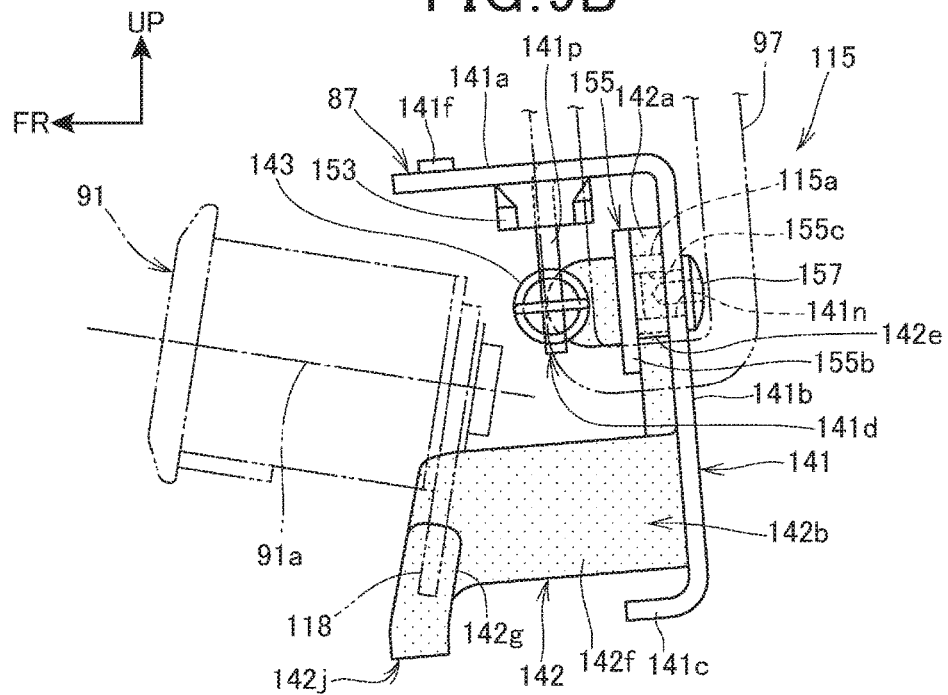

SEAT LOCK STRUCTURE FOR SADDLE RIDING VEHICLE

TECHNICAL FIELD

The present invention relates to a seat lock structure for a saddle riding vehicle in which a seat lock mechanism is directly operated by a key cylinder.

BACKGROUND ART

There has been known a structure in which a seat lock mechanism is connected to a key cylinder by a cable, the key cylinder being adapted to lock and unlock the seat lock mechanism by a key operation, and a guard body for preventing access to a cable is provided to a bracket supporting the key cylinder (for example, see Patent Literature 1).

Also, there has been known a structure formed so that a rear center cover covers a seat lock mechanism to guard the seat lock mechanism (for example, see Patent Literature 2).

CITATION LIST

Patent Literature

Patent Literature 1: Japanese Patent Laid-Open No. 2007-62561
Patent Literature 2: Japanese Patent Laid-Open No. 2010-36596

SUMMARY OF INVENTION

Technical Problem

In Patent Literature 1 and Patent Literature 2, the theft prevention is performed by covering a seat lock mechanism with a peripheral part or an external part of the seat lock mechanism, but this causes enlargement of a structure around the seat lock mechanism. The volume of the storage space provided under the seat is therefore restricted.

It is an object of the present invention to provide a seat lock structure for a saddle riding vehicle which can be downsized.

Solution to Problem

To solve the above problem, the present invention provides a seat lock structure for a saddle riding vehicle, including a seat (17, 57) on which a rider or a passenger sits, a key cylinder (91), and a seat lock mechanism (87) to open and close the seat (17, 57) by a key operation of the key cylinder (91), in which the key cylinder (91) includes a turning arm (118) which is turned by the key operation, the seat lock mechanism (87) includes a first bracket (141) which is fixed to a vehicle body frame (10A), and a second bracket (142) which is slidably supported on the first bracket (141) and engageable with a seat (17, 57) side, and the second bracket (142) is slid by being pressed by the turning arm (118), and a slide regulating portion (142g) formed on the second bracket (142) regulates the second bracket (142) from being slid when the turning arm (118) is unturnable.

In the above configuration, an article storage part (85) for storing articles may be formed below the seat (17, 57), and the seat lock mechanism (87) may be provided in the article storage part (85).

In the above configuration, the article storage part (85) may be configured to spread downward and rearward of the seat lock mechanism (87).

In the above configuration, the key cylinder (91) and the seat lock mechanism (87) may be disposed so as to be at least partially overlapped with each other in a forward-rearward direction.

In the above configuration, the slide regulating portion (142g) may be disposed at a lower portion of the key cylinder (91).

In the above configuration, a striker (97) may be provided below the seat (17, 57), a slit (141g) into which the striker (97) is inserted may be formed in the first bracket (141), and a locking pawl (142e) which is disposed close to one side of the slit (141g) and is engageable with the striker (97) inserted into the slit (141g) may be formed in the second bracket (142), so that the locking pawl (142e) is disposed between the key cylinder (91) and the slit (141g).

Advantageous Effects of Invention

A key cylinder of the present invention includes a turning arm which is turned by a key operation, a seat lock mechanism includes a first bracket which is fixed to a vehicle body frame, and a second bracket which is slidably supported on the first bracket and engageable with a seat side, the second bracket is slid by being pressed by the turning arm, and a slide regulating portion formed on the second bracket regulates the second bracket from being slid when the turning arm is unturnable. Therefore, the second bracket can be prevented from being forcibly slid without the key by providing the slide regulating portion on the second bracket. Thus, the seat lock mechanism can be downsized as compared to a case where a guard member for preventing tampering with the second bracket is provided to a peripheral part of the seat lock mechanism.

An article storage part for storing articles is formed below a seat, and the seat lock mechanism is provided in the article storage part. Therefore, the storage space of the article storage part can be increased by downsizing the seat lock mechanism, thereby improving the usability.

The article storage part which spreads downward and rearward of the seat lock mechanism has a configuration in which articles such as a tool box and a U-shaped lock member can be easily taken in and out from the article storage part, thereby improving the usability of the article storage part.

The key cylinder and the seat lock mechanism are disposed so as to be at least partially overlapped with each other in the forward-rearward direction, thereby enabling occupied spaces of the key cylinder and the seat lock mechanism to be reduced in the forward-rearward direction, and increasing a volume of the article storage part.

The slide regulating portion is disposed below the key cylinder, thereby enabling the second bracket to be easily slid horizontally when the turning arm is turned, and simplifying an engagement structure of the second bracket with the seat side which is opened and closed up and down.

A striker is provided below the seat, a slit into which the striker is inserted is formed in the first bracket, and a locking pawl which is disposed close to one side of the slit and is engageable with the striker inserted into the slit is formed in the second bracket, so that the locking pawl is disposed between the key cylinder and the slit. Therefore, the locking pawl is disposed between the key cylinder and the slit, thereby preventing the tampering with the locking pawl.

BRIEF DESCRIPTION OF DRAWINGS

FIGS. 9A and 9B each are an explanatory view for describing the seat lock mechanism, FIG. 9A is an elevation view of the seat lock mechanism, and FIG. 9B is a left side elevational view of the seat lock mechanism.

DESCRIPTION OF EMBODIMENT

One embodiment of the present invention will be described below with reference to the drawings. Note that in the following description, directions such as forward, rearward, leftward, rightward, upward and downward directions are the same as those with respect to a vehicle body, unless otherwise specified. In addition, a sign "FR" in each drawing represents a forward direction of the vehicle body, a sign "UP" represents an upward direction of the vehicle body, and a sign "LH" represents a leftward direction of the vehicle body.

Figure 1:
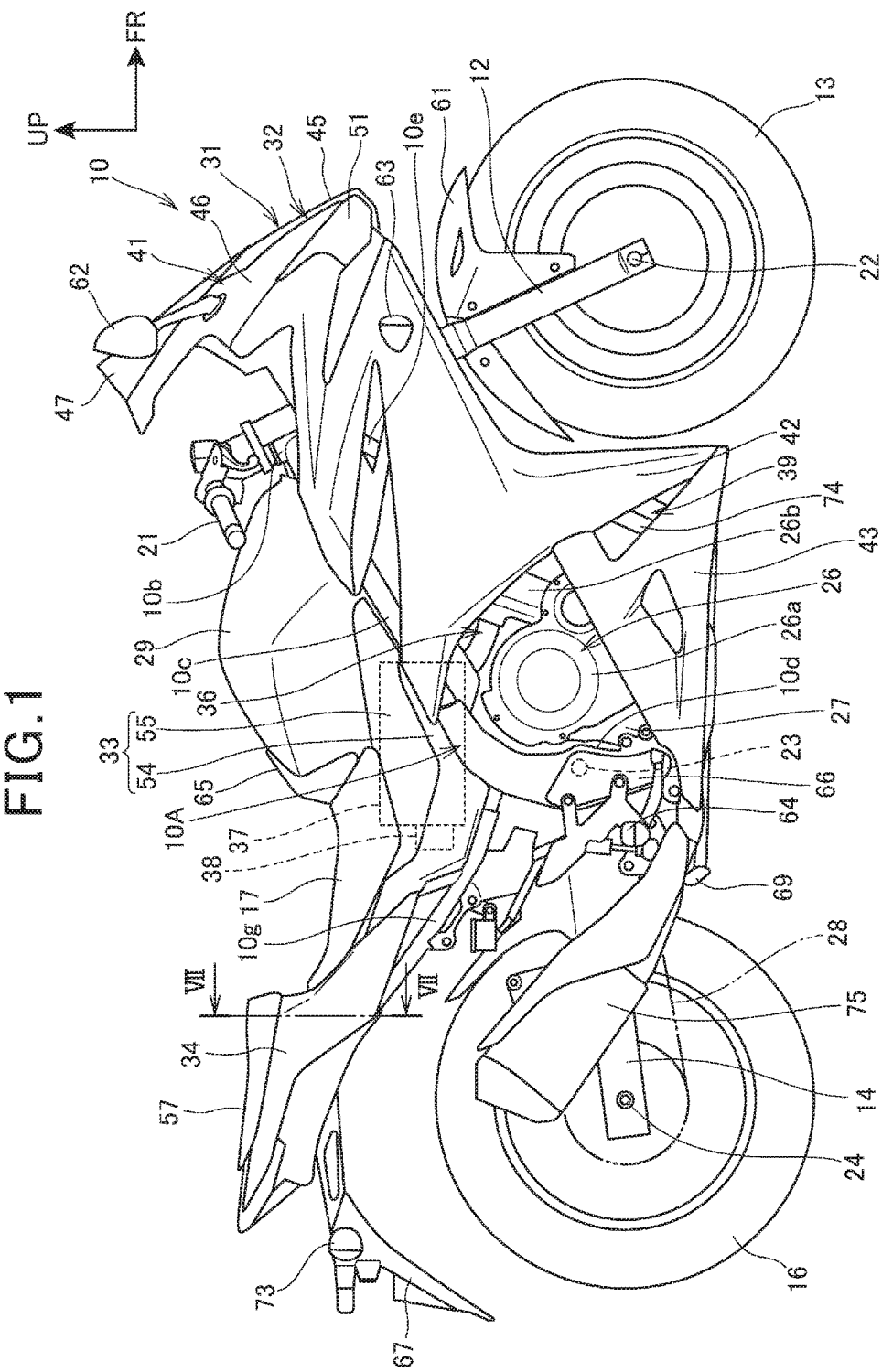
FIG. 1 is a right side elevational view of a motorcycle provided with a seat lock mechanism according to the present invention.

FIG. 1 is a right side elevational view of a motorcycle 10 provided with a seat lock mechanism according to the present invention.

The motorcycle 10 is a saddle riding vehicle in which a front wheel 13 is supported on a front end portion of a vehicle body frame 10A through a front fork 12, a rear wheel 16 is supported on a lower portion of the vehicle body frame 10A through a swing arm 14, and a main seat 17 for a rider is supported on an upper portion of the vehicle body frame 10A.

The vehicle body frame 10A includes: a head pipe 10b; a pair of left and right main frames 10c; a pair of left and right pivot frames 10d; a down frame 10e; a pair of left and right seat frames 10f (see FIG. 7); and a pair of left and right sub frames 10g.

The head pipe 10b steerably supports the front fork 12. The left and right main frames 10c extend obliquely rearwardly and downwardly from the head pipe 10b. The pivot frames 10d extend substantially downwardly from rear ends of the main frames 10c. The down frame 10e extends substantially downwardly from the head pipe 10b. The seat frames 10f extend obliquely rearwardly and upwardly from upper end portions of the pivot frames 10d to support the main seat 17. The sub frames 10g extend obliquely rearwardly and upwardly from upper portions of the pivot frames 10d and in lower sides of the seat frames 10f so as to be connected to rear portions of the seat frames 10f.

The front fork 12 is attached at an upper portion thereof with a bar steering handle 21, and supports at a lower portion thereof the front wheel 13 through a wheel shaft 22. A front end portion of the swing arm 14 is swingably supported on a pivot shaft 23 which is provided to the left and right pivot frames 10d, and a rear end portion of the swing arm 14 supports the rear wheel 16 through a wheel shaft 24.

An engine 26 is supported on a center portion of the vehicle body frame 10A, and transmits power to the rear wheel 16 through a chain 28 from a transmission 27 integrally provided with the engine 26. A fuel tank 29 is supported on the left and right main frames 10c above the engine 26. A tank pad 65 is provided to a rear portion of the fuel tank 29. The pivot frames 10d and the down frame 10e support the engine 26.

The engine 26 includes a crankcase 26a in which a crankshaft is rotatably housed, and a cylinder part 26b rising obliquely upwardly and forwardly from an upper portion at a front of the crankcase 26a. An intake device 36 is connected to a rear portion of the cylinder part 26b. The intake device 36 includes an air cleaner box 37, and an intake duct 38 which is connected to a rear portion of the air cleaner box 37. An exhaust device 39 is connected to a front portion of the cylinder part 26b.

The motorcycle 10 is covered by a vehicle body cover 31. The vehicle body cover 31 includes a front cowl 32, a pair of left and right side cowls 33, and a pair of left and right rear side body covers 34.

The front cowl 32 includes an upper cowl 41, a pair of left and right middle cowls 42, and a pair of left and right lower cowls 43.

The upper cowl 41 includes a center upper cowl 45 which forms a front surface of the front cowl 32, and is located at a center in a vehicle width direction and in a lower portion of the upper cowl 41, and a pair of left and right side upper cowls 46 which are located outside the vehicle width direction, and a windscreen 47 is mounted on the left and right side upper cowls 46. A headlight 51 is disposed below the side upper cowls 46.

The middle cowls 42 form left and right side surfaces of the front cowl 32, and each of the middle cowls 42 covers a front portion of the vehicle body to a position lower than the wheel shaft 22 of the front wheel 13 from a side of the vehicle body. Each of the lower cowls 43 extends to the side of the lower portion of the engine 26 from the front end portion of the lower cowl 43 which is connected to the lower end portion of the middle cowl 42.

The side cowl 33 consists of a substantially V-shaped inner side cowl 54, and an inverse triangular-shaped outer side cowl 55 which covers the outside of the upper portion of the inner side cowl 54. The side cowl 33 covers the lower portions of the main seat 17 and the fuel tank 29 from the side of the vehicle body.

The rear side body cover 34 covers, from the side of the vehicle body, a lower side of a side edge portion of each of a rear portion of the main seat 17 for a rider, and a rear seat 57 for a passenger which is disposed at a rear of the main seat 17.

The air cleaner box 37 and the intake duct 38 are disposed inside the side cowl 33 in the vehicle width direction, particularly the intake duct 38 is disposed inside a rear portion of the inner side cowl 54 in the vehicle width direction.

A reference numeral 61 in the figure represents a front fender which covers the front wheel 13 from above, a reference numeral 62 represents a pair of left and right rearview mirrors which are mounted on the side upper cowls 46, respectively, and a reference numeral 63 represents a pair of left and right front winkers which are mounted on front and upper portions of the middle cowls 42, respectively. A reference numeral 64 represents a pair of left and right steps for a rider, a reference numeral 66 represents a pair of left and right plate members which are attached to side surfaces in the lower portions of the pivot frames 10*d*, respectively, a reference numeral 67 represents a rear fender which covers the rear wheel 16 from above, a reference numeral 69 represents a side stand which is attached to a lower end portion of the left pivot frame 10*d*, a reference numeral 73 represents a pair of left and right rear winkers which are mounted on the rear fender 67, and reference numerals 74, 75 are an exhaust pipe and a muffler, respectively, the exhaust pipe and the muffler constituting the exhaust device 39.

Figure 2:
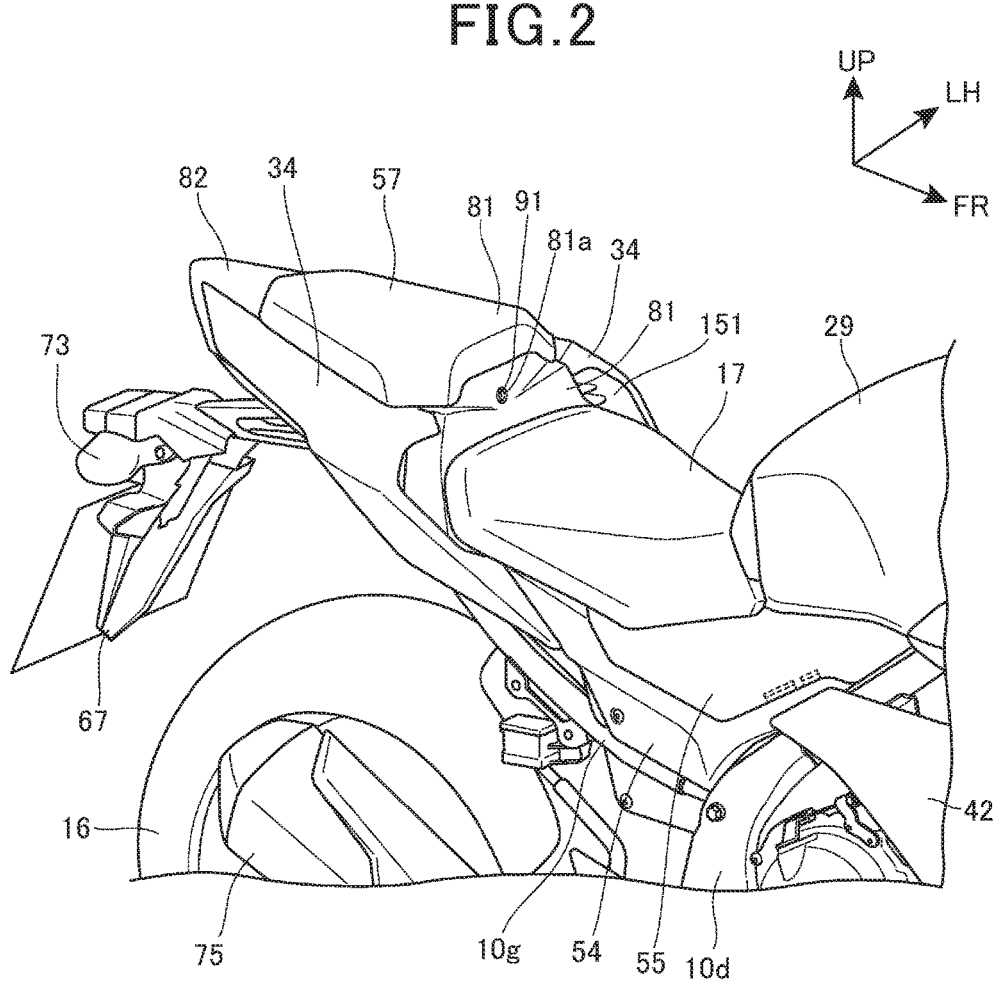
FIG. 2 is a perspective view illustrating a seat lock device of a rear seat and its surrounding.

FIG. 2 is a perspective view illustrating a seat lock device 115 (see FIG. 3) of the rear seat 57 and its surrounding.

A center cowl 81 is provided at the rear of the main seat 17 so as to connect front ends at upper portions of respective left and right rear side body covers 34. A rear center cowl 82 is provided at the rear of the rear seat 57 so as to connect upper edges at the rear end portions of respective left and right rear side body covers 34.

An article storage part 85 (see FIG. 3) is formed in a space surrounded by the left and right rear side body covers 34, the center cowl 81 and the rear center cowl 82 which are described above. An opening 86 (see FIG. 6) formed by the left and right rear side body covers 34, the center cowl 81 and the rear center cowl 82, that is, the opening 86 above the article storage part 85 is covered by the rear seat 57.

The rear seat 57 is configured to be detachable and attachable from/to the vehicle body, and is locked by the seat lock device 115 provided in the article storage part 85. A circular hole 81*a* is opened in a center of the center cowl 81 in the vehicle width direction, and a key cylinder 91 constituting the seat lock device 115 is disposed inside the circular hole 81*a*.

Figure 3:
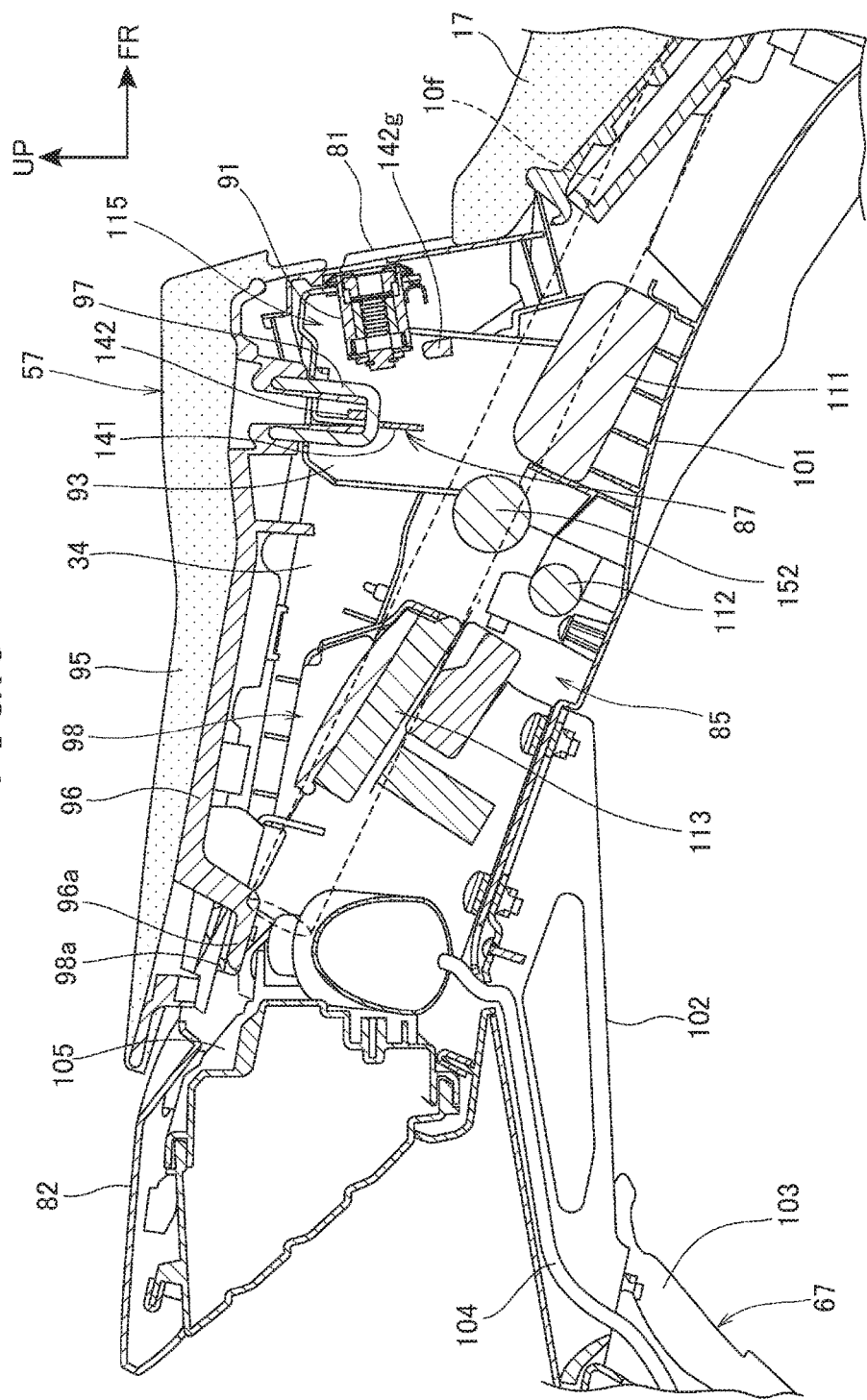
FIG. 3 is a right side sectional view in which a rear portion of the motorcycle is cut along a center line in a vehicle width direction, and a sectional view cut along line III-III of FIG. 6.
Figure 4:
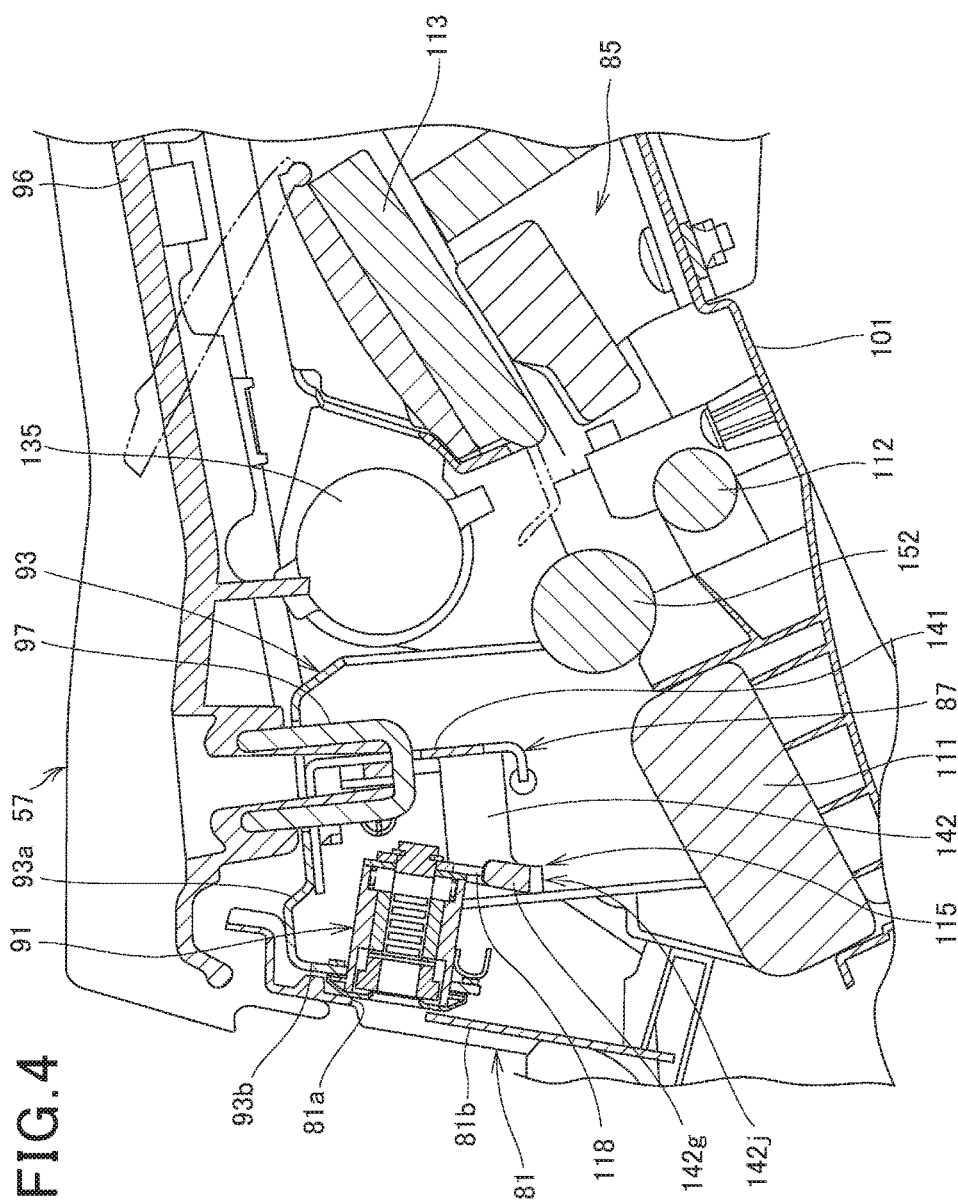
FIG. 4 is a left side sectional view in which the rear portion of the motorcycle 10 is cut along the center line in the vehicle width direction, and a sectional view cut along line IV-IV of FIG. 6.

FIG. 3 is a right side sectional view in which a rear portion of the motorcycle 10 is cut along a center line in the vehicle width direction. FIG. 4 is a left side sectional view in which the rear portion of the motorcycle 10 is cut along the center line in the vehicle width direction.

As illustrated in FIG. 3, a bridge member 93 which extends in the vehicle width direction is attached to the left and right seat frames 10*f*, and the seat lock device 115 is provided to the bridge member 93. The key cylinder 91 and a seat lock mechanism 87 constituting the seat lock device 115 are disposed in the article storage part 85. The article storage part 85 extends downwardly and rearwardly of the seat lock device 115. The above-described bridge member 93 is a component of the vehicle body frame 10A (see FIG. 1).

The rear seat 57 includes a seat cushion member 95 having elasticity, and a bottom plate 96 which is provided on a bottom surface of the seat cushion member 95. The bottom plate 96 is integrally formed at a rear portion thereof with a hook 96*a* which protrudes downwardly and rearwardly, and is provided at a front portion thereof with a substantially U-shaped striker 97 which protrudes downwardly.

The hook 96*a* is engaged with a rear engaging part 98*a* of a rear bracket 98 provided between the left and right seat frames 10*f*, the striker 97 is engaged with the seat lock device 115, and the rear seat 57 is fixed to the vehicle body side in the locked state.

The rear fender 67 is attached through a fender stay 102 to a rear end portion of a rear lower cowl 101 which forms a bottom wall of the article storage part 85. Note that a reference numeral 104 represents a wire harness which energizes the rear winkers 73 (see FIG. 1) and a license plate lamp for illuminating a license plate which is attached to the rear fender 67.

The article storage part 85 is surrounded by the center cowl 81 on a front side of the article storage part 85, the rear center cowl 82 and a tail lamp 105 disposed below the rear center cowl 82 on a rear side of the article storage part 85, the rear lower cowl 101 on a lower side of the article storage part 85, the rear seat 57 on an upper side of the article storage part 85, and the rear side body covers 34 on left and right sides of the article storage part 85. The article storage part 85 houses at a front and lower portion thereof a tool box 111 and a U-shaped lock member 112, and houses at a rear portion thereof an ETC in-vehicle unit 113.

As illustrated in FIG. 4, the bridge member 93 includes an upper wall 93*a* which extends in the vehicle width direction, and a front wall 93*b* which extends substantially downwardly from a front edge of the upper wall 93*a*. The front wall 93*b* is formed to extend along a front wall 81*b* of the center cowl 81.

The upper wall 93*a* is attached with the seat lock mechanism 87 which is engaged with the striker 97, the front wall 93*b* is attached with the key cylinder 91 disposed to face the circular hole 81*a* in the center cowl 81.

The key cylinder 91 and the seat lock mechanism 87 constitute the seat lock device 115.

The seat lock mechanism 87 includes a first bracket 141 which is attached to a lower surface of the upper wall 93*a* of the bridge member 93, and a second bracket 142 which is slidably attached to the first bracket 141 to be engaged or unengaged with the striker 97 of the rear seat 57.

The second bracket 142 is engaged with a turning arm 118 of the key cylinder 91 to be slid to both sides in the vehicle width direction by turning of the turning arm 118. Note that a reference numeral 135 represents an accessory socket provided in the article storage part 85.

Figure 5:
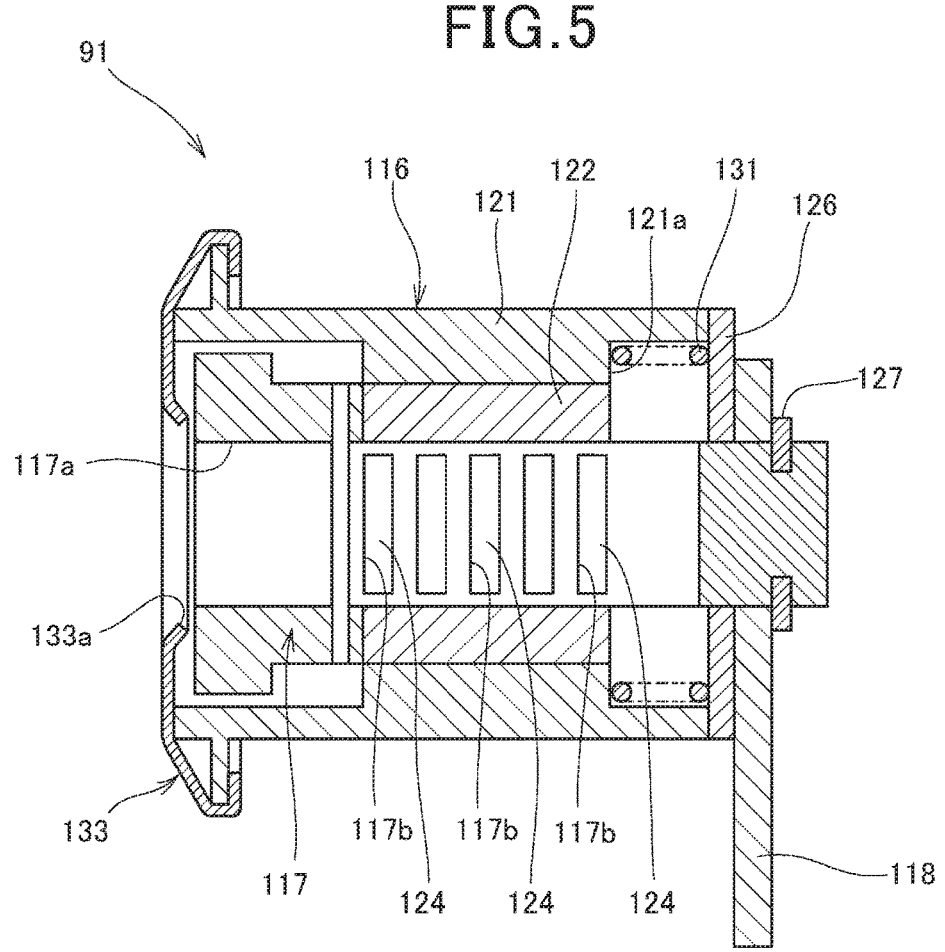
FIG. 5 is a side sectional view illustrating the key cylinder.

FIG. 5 is a sectional view illustrating the key cylinder 91.

The key cylinder 91 includes an outer cylinder 116, a turning member 117 which is turnably inserted into the outer cylinder 116, and the turning arm 118 which is integrally provided to one end portion of the turning member 117.

The outer cylinder 116 includes a main body 121, and a cylindrical member 122 which is fixed inside the main body 121.

The turning member 117 includes a key insertion hole 117*a* into which a key is inserted, a plurality of axis orthogonal holes 117*b* which are opened in a direction orthogonal to an axis of the turning member 117, and tumblers 124 each of which is inserted into the axis orthogonal hole 117*b*. The tumblers 124 are moved in the axis orthogonal holes 117*b* when the key is inserted into the key insertion hole 117*a*. Thus, the tumblers 124 are slid out of axis orthogonal holes (not illustrated) provided in the cylindrical member 122 of the outer cylinder 116, thereby enabling the turning member 117 to be turnable with respect to the cylindrical member 122. When the key is pulled out from the key insertion hole 117*a*, the tumblers 124 are inserted into both of the axis orthogonal holes 117*b* in the turning member 117 and the axis orthogonal holes in the cylindrical member 122 so that the turning member 117 is unturnable with respect to the cylindrical member 122.

One end surface of the outer cylinder 116 is blocked by a plate 126, and the turning member 117 extends to pass through the plate 126.

The turning arm 118 is relatively unturnably supported on the turning member 117, is disposed to be adjacent to the plate 126, and is held by a retaining ring 127 provided to the turning member 117. A compression coil spring 131 is disposed between the plate 126 and a step portion 121a provided in an inner periphery surface of the outer cylinder 116. The compression coil spring 131 biases the turning member 117 through the plate 126 and the turning arm 118 so that the turning member 117 does not get out of the outer cylinder 116. Note that a reference numeral 133 represents a cover member which blocks the outer cylinder 116 and a part of an end surface of the turning member 117, the cover member 133 being provided with a key insertion opening 133a.

Figure 6:
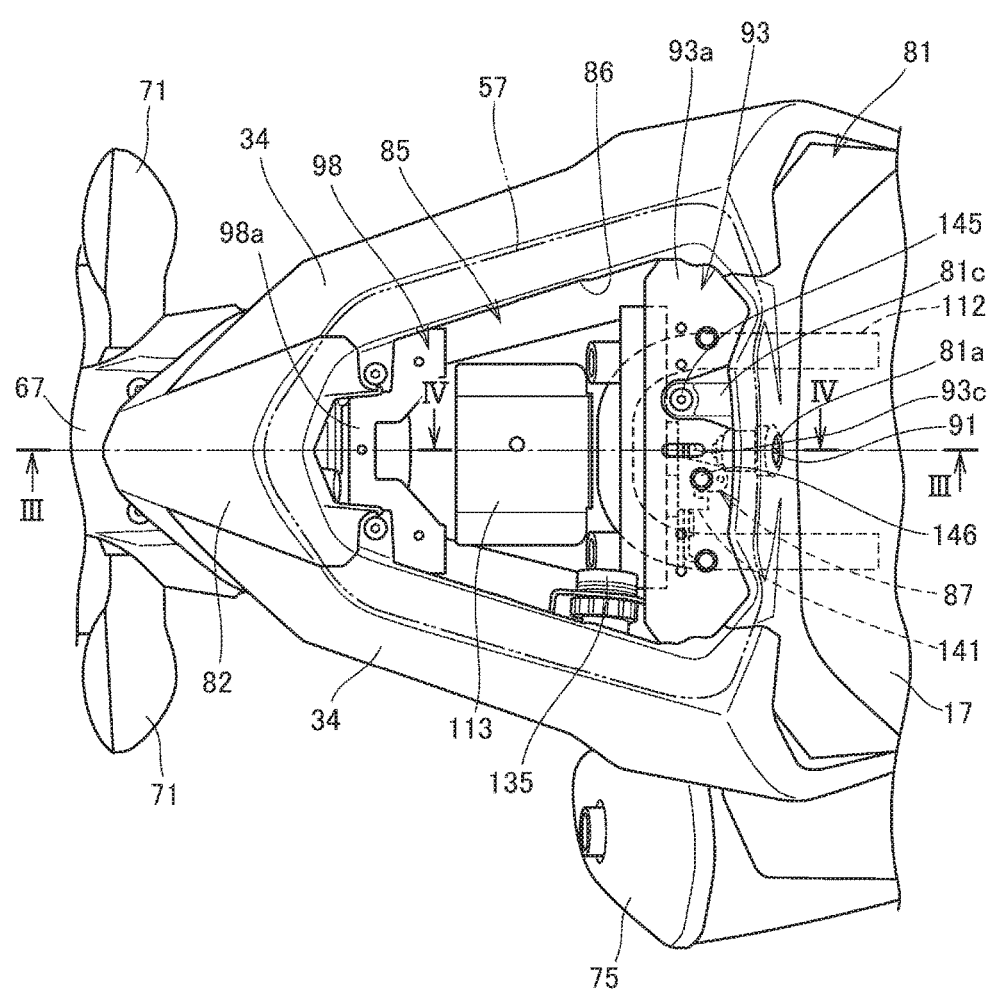
FIG. 6 is a plan view illustrating a vehicle body rear portion with the rear seat removed.

FIG. 6 is a plan view illustrating a vehicle body rear portion with the rear seat 57 removed.

The bridge member 93, the rear bracket 98, the U-shaped lock member 112, the ETC in-vehicle unit 113, and the accessory socket 135 are exposed from the opening 86 of the article storage part 85 provided in the vehicle body rear portion.

A striker insertion hole 93c which is long in a forward-rearward direction of the vehicle body is opened in a center portion in the vehicle width direction of the upper wall 93a of the bridge member 93, in order to pass through the striker 97 (see FIG. 4). On the upper wall 93a of the bridge member 93, a mounting portion 81c of the center cowl 81 is attached by a screw 145 to a left side of the striker insertion hole 93c, and the first bracket 141 of the seat lock mechanism 87 is attached by a bolt 146 to a right side of the striker insertion hole 93c.

The rear bracket 98 is formed in a U shape in a top plan view so as to have the rear engaging part 98a in the rear portion of the rear bracket 98. The screw 145 and the bolt 146 are covered by the rear seat 57, and therefore such fixing members are not exposed to outside, thereby improving the appearance.

Figure 7:
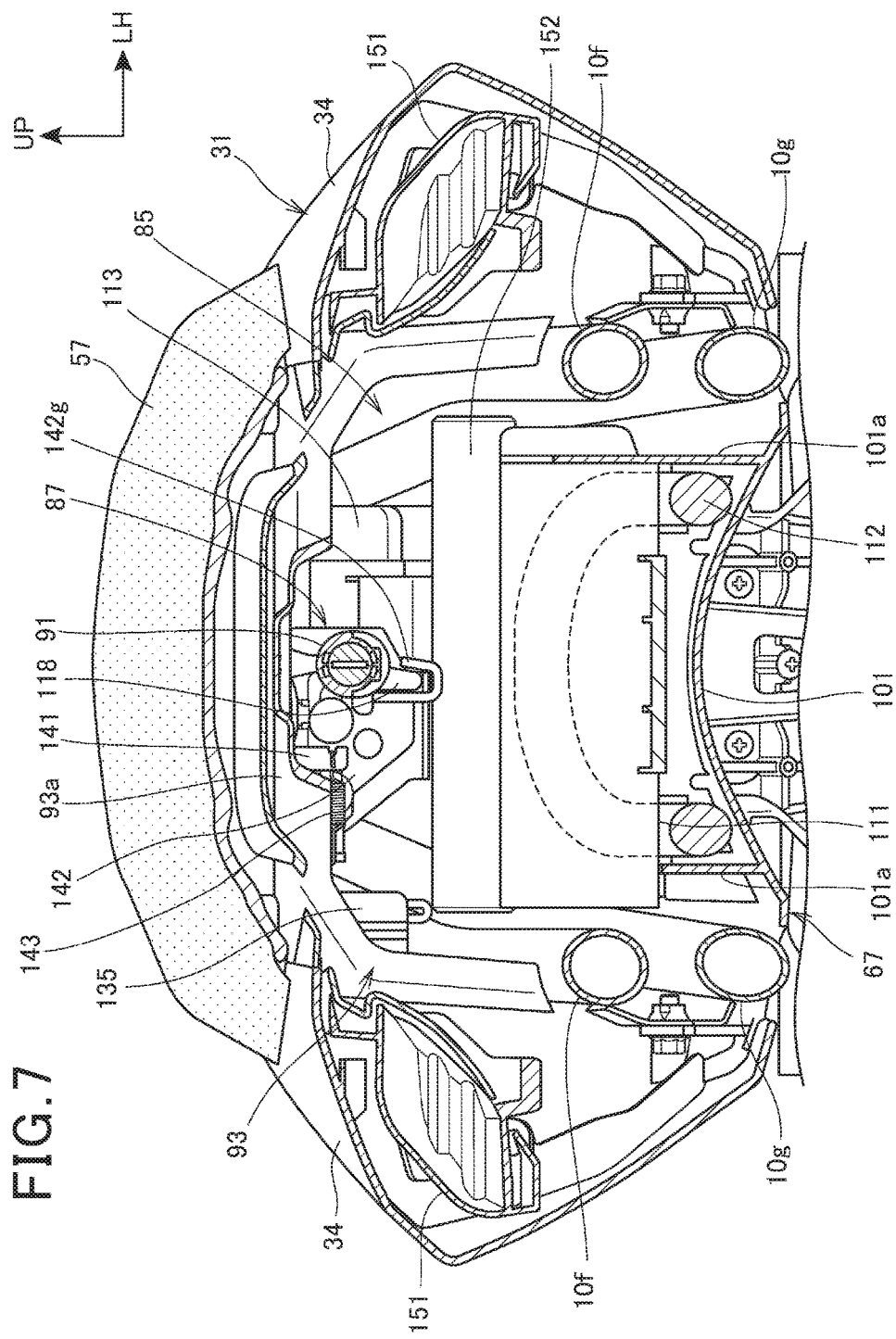
FIG. 7 is a sectional view taken along line VII-VII of FIG. 1.

FIG. 7 is a sectional view taken along line VII-VII of FIG. 1.

The substantially inverted U-shaped bridge member 93 is provided between the left and right seat frames 10f, 10f, and the key cylinder 91 and the seat lock mechanism 87 are supported on an upper portion of the bridge member 93. The key cylinder 91 is located at a center in the vehicle width direction of the vehicle body rear portion. As described above, the substantially inverted U-shaped bridge member 93 enables the seat lock mechanism 87 to be located below the upper wall 93a of the bridge member 93, and a volume of the article storage part 85 to be secured.

The rear lower cowl 101 has a curved sectional shape so that the center portion in the vehicle width direction is higher than outside the vehicle width direction, and is integrally formed with a pair of left and right side walls 101a, 101a which are provided inside the vehicle width direction of the left and right sub frames 10g, 10g and protrude upwardly from the rear lower cowl 101.

A U-shaped lock member 112 is disposed inside the left and right side walls 101a, 101a, and a tool box 111 is disposed in the upper portion of the left and right side walls 101a, 101a.

A pair of left and right louvers 151, 151 are disposed outside the bridge member 93 in the vehicle width direction. The louver 151 is a member for introducing outside air into the vehicle body cover 31, and the introduced outside air is supplied to the engine 26 through the intake duct 38 and the air cleaner box 37 illustrated in FIG. 1. Note that a reference numeral 152 is a rear cross member provided between the left and right sub frames 10g, 10g which serves as a component of the vehicle body frame 10A (see FIG. 1).

Figure 8:
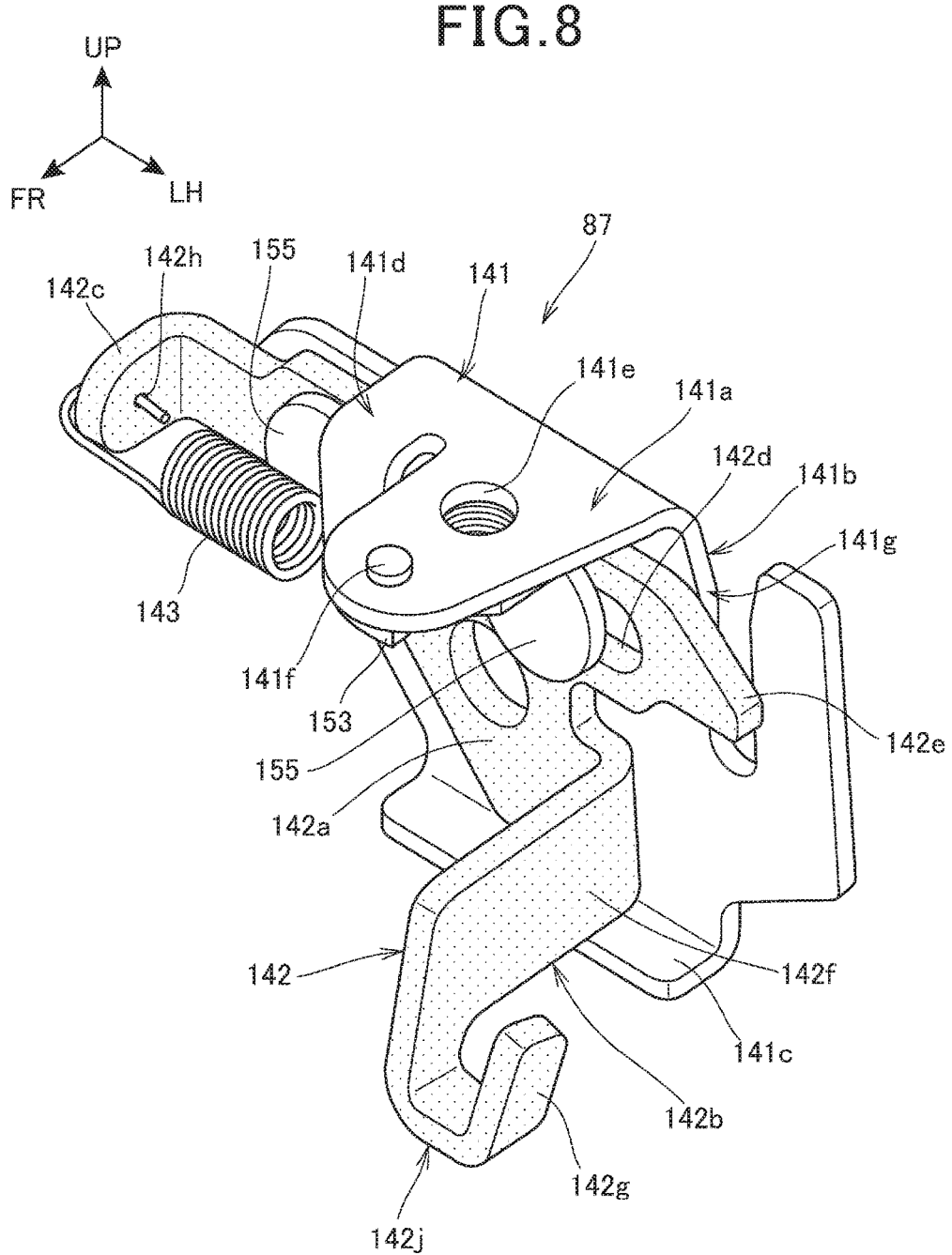
FIG. 8 is a perspective view illustrating the seat lock mechanism.

FIG. 8 is a perspective view illustrating the seat lock mechanism 87.

The seat lock mechanism 87 includes the first bracket 141 which is attached to the bridge member 93 (see FIG. 4), the second bracket 142 (a part indicated by a plurality of dots; the same shall apply hereinafter) which is attached to the first bracket 141 so as to be movable in a vehicle lateral direction (vehicle width direction), and a tension coil spring 143 provided between the first bracket 141 and the second bracket 142 to bias the second bracket 142 toward an engaging side with striker 97 (see FIG. 4).

The first bracket 141 is integrally formed of a forward-descending attachment portion 141a which is attached to the bridge member 93, a rear wall 141b which extends substantially downwardly from a rear edge of the attachment portion 141a, a lower end bent portion 141c which is bent forwardly from a lower edge of the rear wall 141b, and an L-shaped bent portion 141d which continuously extends to the rear portion of the attachment portion 141a and extends forwardly and downwardly from a right upper edge portion of the rear wall 141b.

The attachment portion 141a includes a bolt insertion hole 141e for passing the bolt 146 (see FIG. 6) for fastening to the bridge member 93, and a positioning protrusion 141f which is provided to protrude upwardly at a front of the bolt insertion hole 141e. The positioning protrusion 141f is fitted in a protrusion insertion hole (not illustrated) which is opened to the bridge member 93. When the positioning protrusion 141f is fitted in the protrusion insertion hole, the seat lock mechanism 87 is prevented from being turned with respect to the bridge member 93.

A nut 153 into which the bolt 146 is screwed is attached to a bottom surface of the attachment portion 141a, and a female thread of the nut 153 matches the bolt insertion hole 141e.

The rear wall 141b has a vertically long slit 141g into which the striker 97 is inserted (see FIG. 4).

The second bracket 142 is integrally formed of a vertical wall 142a which slides with the rear wall 141b of the first bracket 141, a front extension portion 142b which extends forwardly from the lower portion of the vertical wall 142a, a right bent portion 142c which is bent forwardly from a right edge of the vertical wall 142a, and a locking pawl 142e which protrudes to the side from a left edge of the vertical wall 142a.

The vertical wall 142a includes a pair of oblong holes 142d into which holding members 155 that are attached to the rear wall 141b of the first bracket 141 are inserted.

The front extension portion 142b includes a longitudinally placed planar extension portion main body 142f, and an L-shaped end portion 142g which is formed to extend leftwardly and upwardly from a lower portion of a distal end of the extension portion main body 142f.

The right bent portion 142c has a spring end insertion hole 142h opened to insert one end of the tension coil spring 143. Both ends of the tension coil spring 143 are hooked on the L-shaped bent portion 141d of the first bracket 141 and the right bent portion 142c, respectively.

The locking pawl 142e overlaps with the slit 141g of the first bracket 141 in the forward-rearward direction when being moved in the leftward direction, but does not overlap with the slit 141g when being moved in the rightward direction. In FIG. 8, the second bracket 142 is moved in the leftward direction with respect to the first bracket 141 by a tensile force of the tension coil spring 143, and the locking pawl 142e overlaps with the slit 141g in the forward-rearward direction.

FIGS. 9A and 9B each are an explanatory view for describing the seat lock mechanism 87. FIG. 9A is an elevation view of the seat lock mechanism 87, and FIG. 9B is a left side elevational view of the seat lock mechanism 87.

As illustrated in FIG. 9A, the L-shaped bent portion 141d of the first bracket 141 includes a spring hooking portion 141p which hooks the tension coil spring 143 and extends vertically. A spring hooking recess portion 141j for hooking the end portion of the tension coil spring 143 is formed in a lower portion of a side end surface 141h of the spring hooking portion 141p.

The slit 141g of the first bracket 141 consists of a tapered portion 141k which is formed so that a width in the vehicle width direction of the tapered portion 141k is gradually reduced as it goes downwardly, and a straight portion 141m which extends downwardly so that the width in the vehicle width direction becomes substantially uniform from a lower end of the tapered portion 141k. Such a shape of the slit 141g enables the striker 97 to be easily inserted into the slit 141g from above.

The holding member 155 is integrally formed of a shaft portion 155a which is attached to the rear wall 141b of the first bracket 141, and is inserted into oblong holes 142d of the second bracket 142, and a flange 155b which is formed larger than an outer diameter of the shaft portion 155a at an end portion of the shaft portion 155a.

A front end portion of the extension portion main body 142f of the front extension portion 142b and the L-shaped end portion 142g constitute an engagement portion 142j having a substantially U-shape or a substantially inverted J-shape in a front view where the turning arm 118 of the key cylinder 91 enters to be engaged therewith.

The engagement between the turning arm 118 and the engagement portion 142j is not disengaged in all ranges where the second bracket 142 is slid by turning of the turning arm 118.

The locking pawl 142e of the second bracket 142 is formed so that a lower edge has a substantially horizontal flat surface, and is located above the striker 97 which is inserted into the slit 141g of the first bracket 141, thereby preventing the striker 97 from being moved upwardly.

Disposing the engagement portion 142j of the second bracket 142 below the key cylinder 91 enables the second bracket 142 to be easily slid horizontally when the turning arm 118 is swung.

As illustrated in FIG. 9B, in the first bracket 141, the attachment portion 141a inclines downwardly toward the front, and the rear wall 141b inclines forwardly. In the second bracket 142, the vertical wall 142a inclines forwardly, and the front extension portion 142b inclines downwardly toward the front.

The key cylinder 91 and the seat lock mechanism 87 are disposed so that partial portions of them (between a rear end portion of the key cylinder 91 and a front end portion of the attachment portion 141a of the seat lock mechanism 87, and between the rear end portion of the key cylinder 91 and a front end portion of the front extension portion 142b) are overlapped with each other in the forward-rearward direction, and the key cylinder 91 is disposed forward of the locking pawl (see FIG. 9A) of the second bracket 142.

An axial line 91a of the key cylinder 91 (for more details, the axial line 91a of the turning member 117 (see FIG. 5)) inclines upwardly toward the front, and the turning arm 118 of the key cylinder 91 extends along the engagement portion 142j of the second bracket 142.

The holding member 155 has a female thread 155c formed in the shaft portion 155a, and a hexagon socket head bolt 157 which is inserted into the bolt insertion hole 141n formed in the rear wall 141b of the first bracket 141 is screwed in the female thread 155c of the shaft portion 155a to attach the holding member 155 to the rear wall 141b.

The spring hooking portion 141p of the L-shaped bent portion 141d in the first bracket 141 is formed substantially parallel to the rear wall 141b, and overlaps with the right bent portion 142c of the second bracket 142 in a side view.

Each of the first bracket 141 and the second bracket 142 is formed by bending a sheet of plate, and the second bracket 142 has a plate thickness thicker than the first bracket 141.

The operation of the seat lock device 115 described above will be described as follows.

Figure 10:
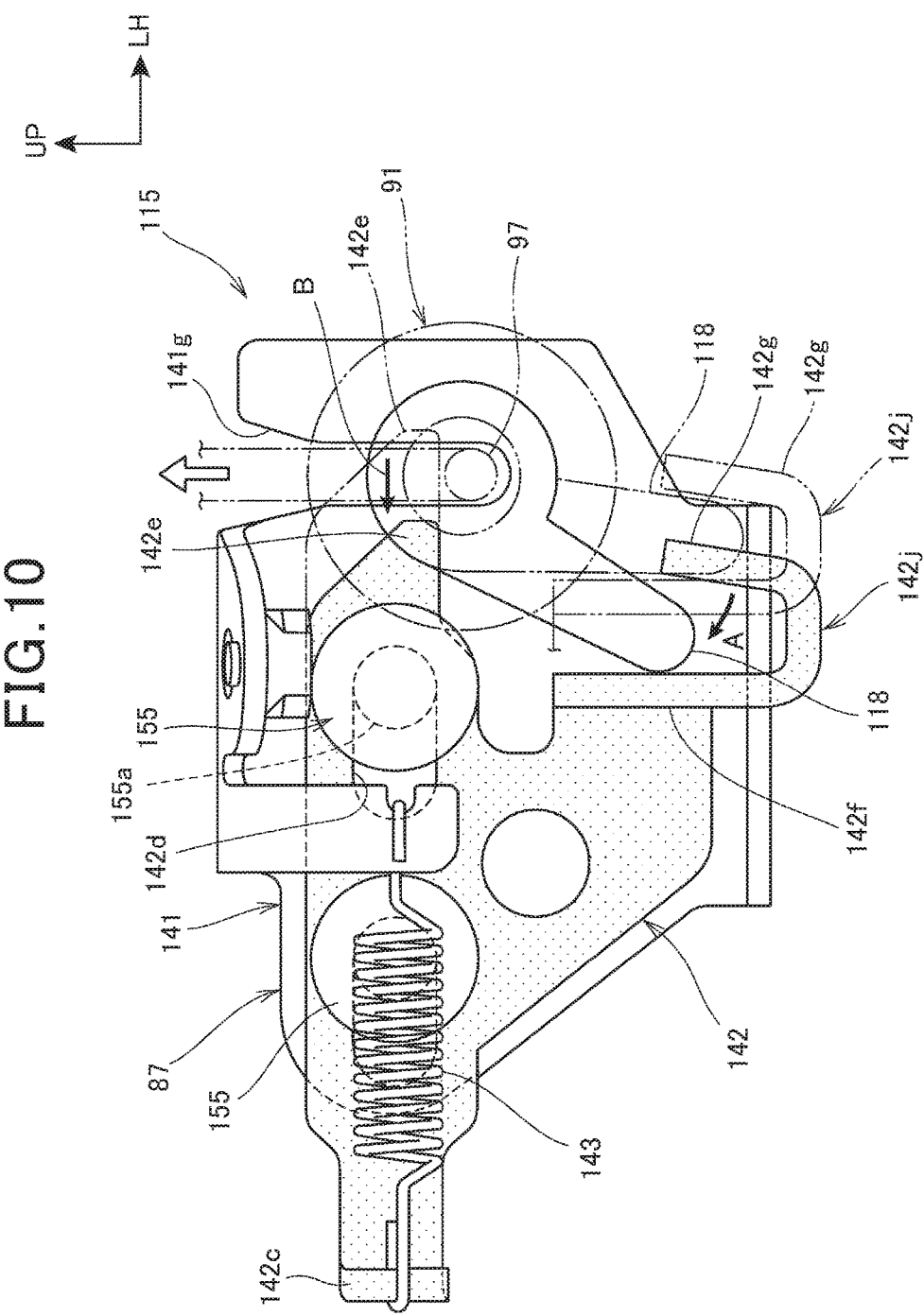
FIG. 10 is an operation diagram illustrating the operation of the seat lock device.

FIG. 10 is an operation diagram illustrating the operation of the seat lock device 115.

In FIG. 9A, the striker 97 of the rear seat 57 (see FIG. 4) is inserted into the slit 141g of the first bracket 141, and the locking pawl 142e of the second bracket 142 is located above the striker 97. Furthermore, the turning arm 118 of the key cylinder 91 is engaged with the engagement portion 142j of the second bracket 142. Therefore, the turning arm 118 is unturnable unless the key is inserted into the key cylinder 91. That is, in FIG. 9A, the seat lock device 115 is locked, and therefore the rear seat 57 cannot be opened.

In this state, when the rear seat 57 is tried to be forcibly opened with a bar-like member or the like without using a key to move the second bracket 142 rightwardly, the L-shaped end portion 142g of the front extension portion 142b contacts with the turning arm 118 because the engagement portion 142j of the second bracket 142 is engaged with the turning arm 118. Therefore, the L-shaped end portion 142g is formed to surround the turning arm 118, thereby regulating the rightward movement of the second bracket 142 to prevent the seat lock device 115 from being released.

When the key is inserted into the key cylinder 91 to turn the turning member 117 (see FIG. 5) and the turning arm 118 in a direction indicated by an arrow A as illustrated in FIG. 10 in a state where the above-described rear seat 57 (see FIG. 4) is locked, a distal end portion of the turning arm 118 presses the extension portion main body 142f of the second bracket 142 rightwardly. As a result, the second bracket 142 slides rightwardly with respect to the first bracket 141 as indicated by an arrow B. That is, the locking pawl 142e of the second bracket 142 is moved to a position which does not overlap with the slit 141g of the first bracket 141 in the forward-rearward direction. Thus, the striker 97 whose upper movement is regulated by the locking pawl 142e can be moved upwardly, thereby enabling the rear seat 57 to be opened.

When the key is kept inserted into the key cylinder 91 after the rear seat 57 is opened, the second bracket 142 is moved leftwardly by an elastic force of the tension coil spring 143 while turning the turning arm 118 by the extension portion main body 142f, and is returned to a position where the locking pawl 142e overlaps with the slit 141g in the forward-rearward direction. In this state, when the rear seat 57 is closed and the striker 97 is inserted into the slit 141g, the locking pawl 142e is moved rightwardly once, and then returned leftwardly to be moved above the striker 97. In this state, when the key is extracted from the key cylinder 91, the seat lock device 115 returns again to the locked state.

When the key is extracted from the key cylinder 91 after the rear seat 57 is opened, a movement position of the second bracket 142 and a turning position of the turning arm 118 are held in the state at that time.

For example, (1) when the key is extracted in a state where the second bracket 142 is moved rightwardly and the locking pawl 142e does not overlap with the slit 141g in the forward-rearward direction, the second bracket 142 is held at the position. Thus, in order to close the rear seat 57, the rear seat 57 is reclined forwardly to insert the striker 97 in the slit 141g, and then while maintaining the state, the key is inserted into the key cylinder 91 and turned counterclockwise. Thereby, the locking pawl 142e is moved to the position which overlaps with the slit 141g in the forward-rearward direction to result in the locked state.

(2) When the key is extracted in a state where the second bracket 142 is moved leftwardly and the locking pawl 142e overlaps with the slit 141g in the forward-rearward direction, the second bracket 142 is held at the position, and in order to close the rear seat 57, the rear seat 57 is reclined forwardly, and the striker 97 contacts an upper edge of the locking pawl 142e. In this state, when the key is inserted into the key cylinder 91 and turned clockwise, the locking pawl 142e can be moved rightwardly, and the rear seat 57 is completely closed to dispose the striker 97 below the locking pawl 142e to result in the locked state.

As described above, in order to lock the rear seat 57, it is necessary to surely insert the key into the key cylinder 91 before the rear seat 57 is completely closed as described in the above (1) and (2), thereby preventing the rear seat 57 from being locked in a state where the key is placed in the article storage part 85 (see FIG. 4).

As illustrated in FIG. 1, FIG. 4, and FIGS. 9A, 9B, in the seat lock structure for the motorcycle 10 serving as a saddle riding vehicle which is provided with a rear seat 57 serving as a seat on which a rider sits or a seat on which a passenger sits, a key cylinder 91, and a seat lock mechanism 87 to open and close the rear seat 57 by the key operation of the key cylinder 91, the key cylinder 91 includes the turning arm 118 which is turned by the key operation, the seat lock mechanism 87 includes the first bracket 141 which is fixed to the vehicle body frame 10A, and the second bracket 142 which is slidably supported on the first bracket 141 and engageable with the rear seat 57 side, the second bracket 142 is slid by being pressed by the turning arm 118, and the L-shaped end portion 142g serving as a slide regulating portion formed on the second bracket 142 regulates the second bracket 142 from being slid when the turning arm 118 is unturnable. With this configuration, the L-shaped end portion 142g is provided to the second bracket 142, thereby preventing the second bracket 142 from being forcibly slid without the key. Accordingly, the seat lock mechanism 87 can be downsized as compared to a case where the guard member for preventing tampering with the second bracket 142 is provided to a peripheral part of the seat lock mechanism 87. Cables for connecting the key cylinder and the seat lock mechanism are not required unlike before, thereby reducing the cost and improving the assemblability.

When closing the rear seat 57, it is necessary to insert the key into the key cylinder 91 to turn the turning arm 118, thereby preventing the seat from being locked in the state where the key is placed in the article storage part 85 below the rear seat 57. Accordingly, there is provided the seat lock mechanism 87 which is user-friendly.

Since it is not necessary to provide the guard member to the periphery parts of the seat lock mechanism 87, the number of ribs for restricting tampering with the seat lock mechanism 87 can be reduced when the ribs are provided to an exterior part, for example. Thereby, the cost can be reduced, and a split surface of the exterior part can be provided to the periphery of the seat lock mechanism 87. Accordingly, the degree of freedom of arrangement of the exterior part can be increased, and the appearance can be improved.

As illustrated in FIG. 3 and FIG. 4, the article storage part 85 for storing articles is formed below the rear seat 57, and the seat lock mechanism 87 is provided in the article storage part 85. Therefore, the storage space of the article storage part 85 can be increased by downsizing the seat lock mechanism 87, thereby improving the usability.

The article storage part 85 which spreads downward and rearward of the seat lock mechanism 87 has a configuration in which articles such as the tool box 111 and the U-shaped lock member 112 can be easily taken in and out from the article storage part 85, thereby improving the usability of the article storage part 85.

As illustrated in FIG. 4, the key cylinder 91 and the seat lock mechanism 87 are disposed so as to be at least partially overlapped with each other in the forward-rearward direction, thereby enabling the occupied spaces of the key cylinder 91 and the seat lock mechanism 87 to be reduced in the forward-rearward direction, and increasing the volume of the article storage part 85, particularly, the volume of the storage space rearward of the seat lock mechanism 87.

As illustrated in FIG. 8 and FIG. 9A, the L-shaped end portion 142g is disposed below the key cylinder 91, thereby enabling the second bracket 142 to be easily slid horizontally when the turning arm 118 is turned, and simplifying the engagement structure of the second bracket 142 with the rear seat 57 side which is opened and closed up and down (i.e., the engagement structure of the striker 97 and the locking pawl 142e).

As illustrated in FIG. 4 and FIGS. 9A, 9B, the striker 97 is provided at a lower portion of the rear seat 57, the slit 141g into which the striker 97 is inserted is formed in the first bracket 141, and the locking pawl 142e which is disposed close to one side of the slit 141g and is engageable with the striker 97 inserted into the slit 141g is formed in the second bracket 142, so that the locking pawl 142e is disposed between the key cylinder 91 and the slit 141g. Therefore, the locking pawl 142e is disposed between the key cylinder 91 and the slit 141g to cover the locking pawl 142e by the key cylinder 91 and the first bracket 141 in which the slit 141g is formed, thereby preventing the tampering with the locking pawl 142e.

The above-described embodiment is only for purposes of illustrating one aspect of the present invention, and can be arbitrarily modified and applied without departing from the scope of the present invention.

For example, in the above-described embodiment, the seat lock device 115 is provided only in the rear seat 57 as illustrated in FIG. 3, but without being limited to the rear seat 57, the seat lock device 115 may be provided only in the main seat 17, or in both of the main seat 17 and the rear seat 57.

REFERENCE SIGNS LIST

10 Motorcycle (saddle riding vehicle)
10A Vehicle body frame
17 Main seat (seat)

57 Rear seat (seat)
85 Article storage part
87 Seat lock mechanism
91 Key cylinder
97 Striker
115 Seat lock device
118 Turning arm
141 First bracket
141g Slit
142 Second bracket
142e Locking pawl
142g L-shaped end portion (slide regulating portion)

The invention claimed is:

1. A seat lock structure for a saddle riding vehicle, comprising:
a seat on which a rider or a passenger sits;
a key cylinder; and
a seat lock mechanism to open and close the seat by a key operation of the key cylinder, wherein
the key cylinder includes a turning arm which is turnable by a key operation only when a key is inserted into the key cylinder,
the seat lock mechanism includes a first bracket which is fixed to a vehicle body frame, and a second bracket which is slidably supported on the first bracket and engageable with a seat side,
the second bracket is integrally provided with an extension portion main body which is disposed on one side in a sliding direction of the second bracket at a distal end portion of the turning arm, and with a slide regulating portion which is disposed on another side in the sliding direction,
the extension portion main body and the slide regulating portion are formed in a U-shape, are disposed along the distal end portion of the turning arm to surround the distal end portion, and are disposed at a distance from a turning center of the turning arm in a slide orthogonal direction which is orthogonal to the sliding direction of the second bracket,
the extension portion main body and the slide regulating portion constitute an engagement portion,
the turning arm extends along the engagement portion,
the second bracket is slid in the sliding direction when the extension portion main body is pressed by the turning arm, and the slide regulating portion regulates the second bracket from being slid in the sliding direction when the key is not inserted into the key cylinder, and
when the key is extracted from the key cylinder after the seat is opened, the slide regulating portion holds a turning position of the turning arm to maintain the seat in an open state, and when the key is extracted from the key cylinder with the seat closed, the slide regulating portion holds the turning position of the turning arm to lock the seat.

2. The seat lock structure for a saddle riding vehicle according to claim 1, wherein an article storage part for storing articles is formed below the seat, and the seat lock mechanism is provided in the article storage part.

3. The seat lock structure for a saddle riding vehicle according to claim 2, wherein the article storage part spreads downward and rearward of the seat lock mechanism.

4. The seat lock structure for a saddle riding vehicle according to claim 1, wherein the key cylinder and the seat lock mechanism are disposed so as to be at least partially overlapped with each other in a forward-rearward direction.

5. The seat lock structure for a saddle riding vehicle according to claim 1, wherein the slide regulating portion is disposed below the key cylinder.

6. The seat lock structure for a saddle riding vehicle according to claim 1, wherein a striker is provided at a lower portion of the seat, a slit into which the striker is inserted is formed in the first bracket, and a locking pawl which is disposed close to one side of the slit and is engageable with the striker inserted into the slit is formed in the second bracket, so that the locking pawl is disposed between the key cylinder and the slit.

7. The seat lock structure for a saddle riding vehicle according to claim 2, wherein the key cylinder and the seat lock mechanism are disposed so as to be at least partially overlapped with each other in a forward-rearward direction.

8. The seat lock structure for a saddle riding vehicle according to claim 3, wherein the key cylinder and the seat lock mechanism are disposed so as to be at least partially overlapped with each other in a forward-rearward direction.

9. The seat lock structure for a saddle riding vehicle according to claim 2, wherein the slide regulating portion is disposed below the key cylinder.

10. The seat lock structure for a saddle riding vehicle according to claim 3, wherein the slide regulating portion is disposed below the key cylinder.

11. The seat lock structure for a saddle riding vehicle according to claim 4, wherein the slide regulating portion is disposed below the key cylinder.

12. The seat lock structure for a saddle riding vehicle according to claim 2, wherein a striker is provided at a lower portion of the seat, a slit into which the striker is inserted is formed in the first bracket, and a locking pawl which is disposed close to one side of the slit and is engageable with the striker inserted into the slit is formed in the second bracket, so that the locking pawl is disposed between the key cylinder and the slit.

13. The seat lock structure for a saddle riding vehicle according to claim 3, wherein a striker is provided at a lower portion of the seat, a slit into which the striker is inserted is formed in the first bracket, and a locking pawl which is disposed close to one side of the slit and is engageable with the striker inserted into the slit is formed in the second bracket, so that the locking pawl is disposed between the key cylinder and the slit.

14. The seat lock structure for a saddle riding vehicle according to claim 4, wherein a striker is provided at a lower portion of the seat, a slit into which the striker is inserted is formed in the first bracket, and a locking pawl which is disposed close to one side of the slit and is engageable with the striker inserted into the slit is formed in the second bracket, so that the locking pawl is disposed between the key cylinder and the slit.

15. The seat lock structure for a saddle riding vehicle according to claim 5, wherein a striker is provided at a lower portion of the seat, a slit into which the striker is inserted is formed in the first bracket, and a locking pawl which is disposed close to one side of the slit and is engageable with the striker inserted into the slit is formed in the second bracket, so that the locking pawl is disposed between the key cylinder and the slit.

* * * * *